United States Patent

Hikita

[11] 3,874,317
[45] Apr. 1, 1975

[54] COOLING WATER INTAKE APPARATUS FOR MARINE VESSELS

[76] Inventor: Isao Hikita, 786-2 Nishioizumi, Nerimaku, Tokyo, Japan

[22] Filed: Aug. 20, 1973

[21] Appl. No.: 389,990

[30] Foreign Application Priority Data
Dec. 15, 1972 Japan.............................. 47-125905
May 17, 1973 Japan.............................. 48-55015

[52] U.S. Cl................................. 114/198, 115/.5 R
[51] Int. Cl............................................. B63b 13/00
[58] Field of Search............ 115/.5 R; 114/197, 198; 285/38, 356, 393

[56] References Cited
UNITED STATES PATENTS

| | | | |
|---|---|---|---|
| 25,094 | 8/1859 | Clear | 114/198 |
| 88,008 | 3/1869 | Chase et al. | 114/198 |
| 1,090,584 | 3/1914 | Ventrice | 115/.5 R |
| 1,998,283 | 4/1935 | Mackert | 285/393 |
| 2,333,243 | 11/1943 | Glab | 285/38 |
| 3,274,970 | 9/1966 | Daniel | 115/.5 R |
| 3,430,990 | 3/1969 | Nelson | 285/356 |
| 3,687,495 | 8/1972 | Sakamoto et al. | 285/356 |

Primary Examiner—Trygve M. Blix
Assistant Examiner—Edward R. Kazenske
Attorney, Agent, or Firm—Armstrong, Nikaido & Wegner

[57] ABSTRACT

A cooling water intake apparatus for marine vessels comprising a tubular block which is adapted to be fitted into a through hole provided in a hull, an intake pipe which is removably inserted in the tubular block, a strainer which is attached to the intake pipe and a closing device which is provided on the tubular block, wherein the closing device is adapted to open and close the intake port of the tubular block at a more outboard side than the intake pipe.

12 Claims, 8 Drawing Figures

COOLING WATER INTAKE APPARATUS FOR MARINE VESSELS

BACKGROUND OF THE INVENTION

The present invention relates to a cooling water intake apparatus of a main engine cooling system of a vessel which utilizes sea water as the cooling water.

As is known, an internal combustion engine or steam engine is available as the main engine of the vessel, and the former requires cooling for itself and the latter is provided with a condenser or oil cooler. In any case, the main engine of the vessel has an engine cooling system utilizing sea water as the cooling water.

The sea water as the cooling water is supplied to said engine cooling system by a scooping means which utilizes a high speed of the vessel and a pumping means when the speed of the vessel is low. In either case, the cooling water intake apparatus is provided at the hull of the vessel.

In case of said conventional cooling water intake apparatus, sea drifts often stick to the intake port or the intake pipe provided at the side hull of the vessel. If the drifts accumulate at the intake port, the intake amount of the sea water reduces and therefore the cooling effect of the main engine deteriorates.

Particularly, in recent years, such drifts of various synthetic resins as vinyl bags, etc. increase in the sea. Accordingly, these drifts clog the intake port and the main engine often malfunctions.

To remove such the drifts adhering at the intake port, direct removing work of clogging materials by a diver or disassembly of the intake pipe and the piping connected to the engine cooling system is required; accordingly, removal of such sea drifts is troublesome and expensive. Furthermore, it is necessary to present the sea water from intruding into the vessel during removing work and technical difficulty always accompanies.

The present invention provides a cooling water intake apparatus in which the intake port is provided with a closing means capable of freely opening and closing the intake port, an intake pipe is removably mounted on said intake port and a strainer is remountably attached to the intake pipe, thus eliminating the disadvantages described above.

SUMMARY

The cooling water intake apparatus in accordance with the present invention comprises a tubular block which is adapted to be secured in a through hole provided in the hull of the vessel, an intake pipe which is removably inserted into said tubular block, a strainer which is remountably attached to said intake pipe, an intake pipe holding means which holds said intake pipe at said tubular block and an intake port closing means provided at the tubular block such as, for example, a shut-off plate which opens and closes the intake port of the tubular block, wherein said closing means is adapted so as to open and close the intake port of the tubular block at a more outboard side than the intake pipe and the intake pipe is adapted so that it can be dismounted from the tubular block when said closing means is operated to close the intake port.

BRIEF DESCRIPTION OF THE DRAWINGS

The present invention is illustrated in detail by the accompanying drawings whereon.

DETAILED DESCRIPTION OF THE INVENTION

Figure 1:
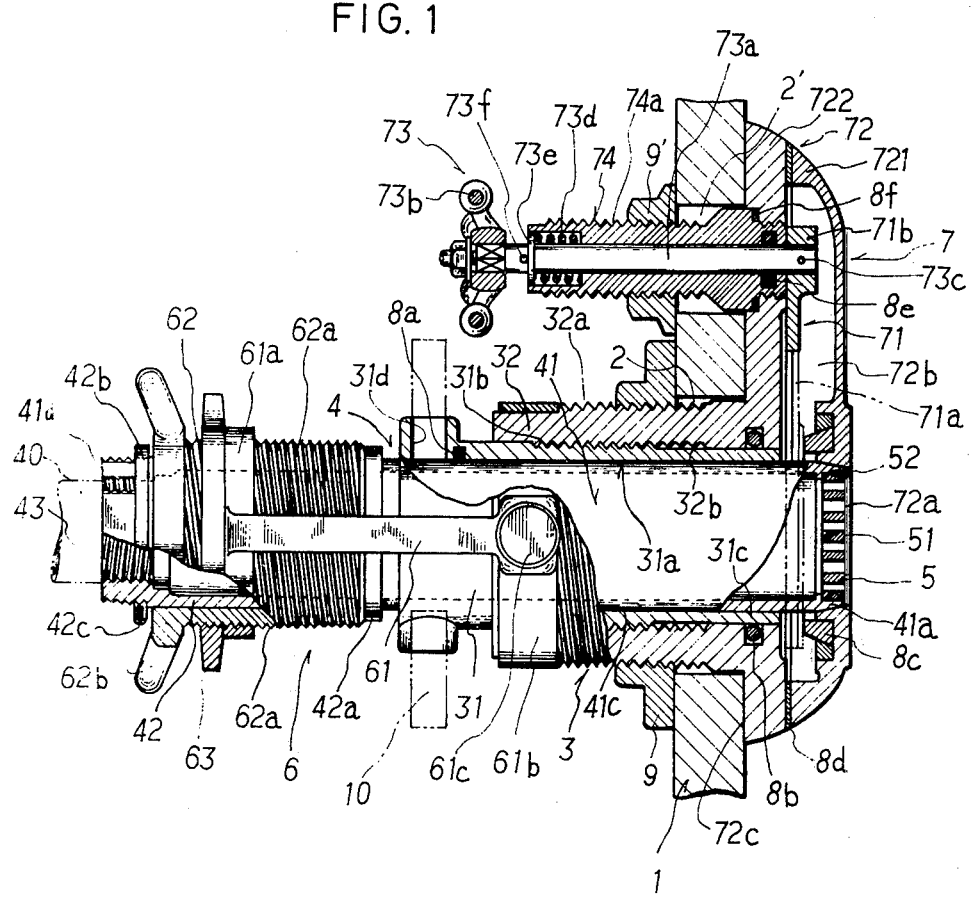
FIG. 1 is a cross sectional view of a principal part of the cooling water intake apparatus in accordance with the present invention.
Figure 2:
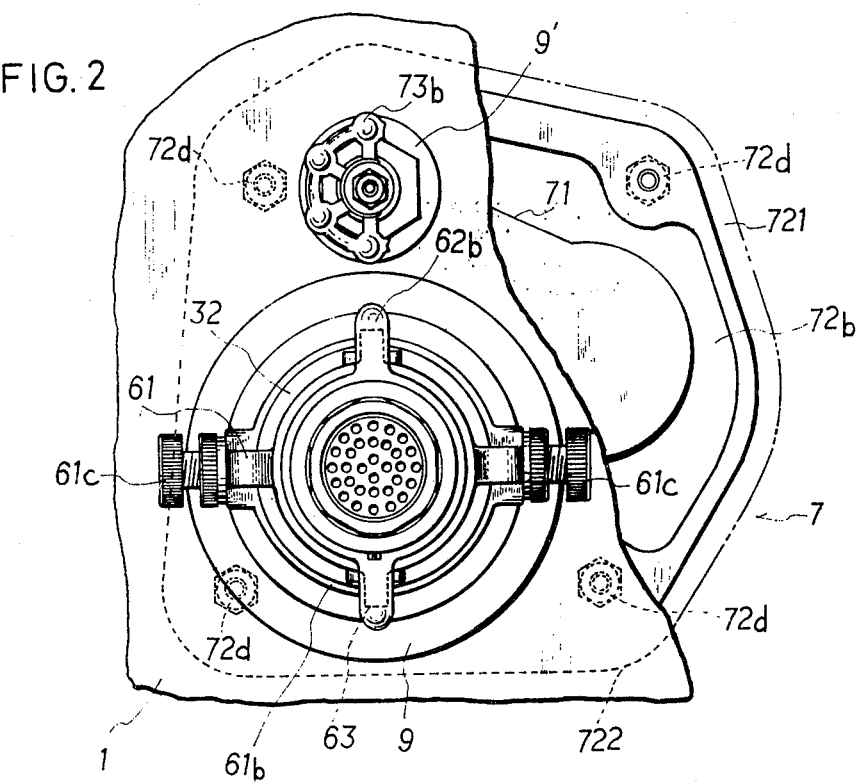
FIG. 2 is a left side view of said apparatus shown in FIG. 1 as seen from the inboard side.
Figure 3:
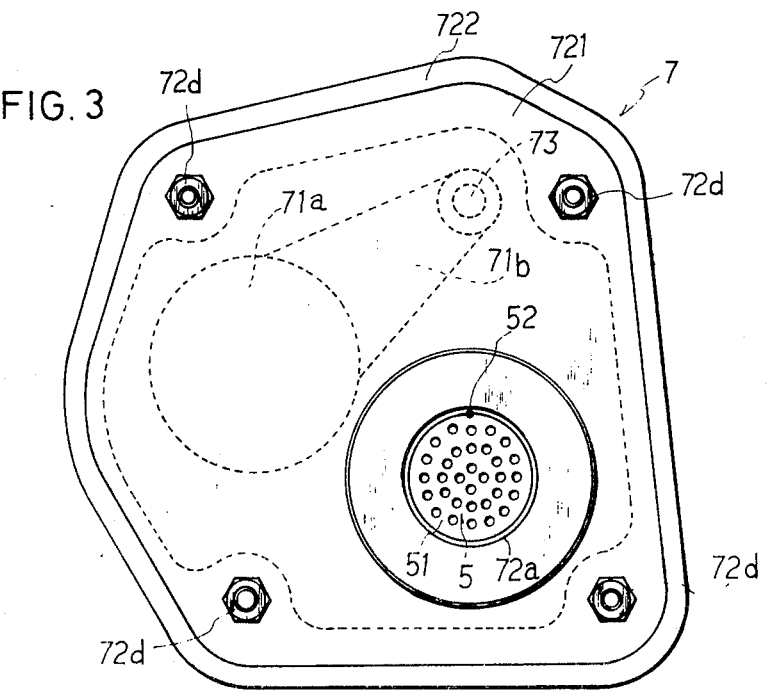
FIG. 3 is a right side view of said apparatus shown in FIG. 1 as seen from the outboard side.

Referring to FIGS. 1 to 4, there is shown a cooling water intake apparatus (hereinafter referred to as the "apparatus") for marine vessels in accordance with the present invention, comprising tubular block 3 which is secured in through hole 2 provided in hull 1, intake pipe 4 which is removably inserted in said tubular block 3, strainer 5 which is remountably attached to said intake pipe 4, intake pipe holding means 6 such as, for example, holding frame 61 which is adapted to hold intake pipe 4 at said tubular block 3, and closing means 7 such as, for example, shut-off plate 71 which is provided at said tubular block 3 to open and close the intake port of the tubular block, wherein said intake pipe holding means 6 is adapted to slidably hold intake pipe 4 inserted in tubular block 3 so that an outboard side end of said intake pipe 4 can be projected outside the hull and said closing means is adapted to close the intake port of the tubular block at a more outboard side than said intake pipe when, for example, the intake pipe is retreated toward the inside of the hull.

Said tubular block 3 comprises internal cylinder 31 which has an inside diameter so that intake pipe 4 is removably inserted and external cylinder 32 which is secured in through hole 2 of the hull, and closing means 7 is provided at the outboard side of said tubular block. The external periphery of external cylinder 32 is provided with thread 32a; for example, the tubular block is secured in through hole 2 of the hull with clamp 9.

Said tubular block 3 is constructed so that packing 8a is set in internal periphery 31a of internal cylinder 31 into which said intake pipe 4 is inserted and packing 8b is set on external cylinder 32 into which said internal cylinder 31 is inserted to prevent intrusion of sea water.

Said intake pipe 4 is provided with strainer 5 at outboard side end 41a of pipe body 41 and the inboard side end of pipe body 41 is provided with coupling part 42 to be coupled to intake pipe holding means 6 such as, for example, holding frame 61. Pipe body 41 is removably inserted into internal cylinder 31 of said tubular block 3.

Said strainer 5 can be a material having intake surface 51 with a number of through holes such as, for example, a net and is preferable to be mountably attached to said intake pipe 4, for example, at outboard side end 41a of said intake pipe 4 with set screws 52.

Figure 4:
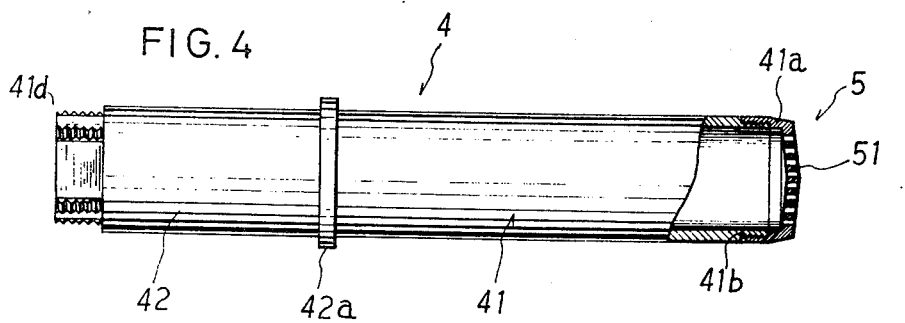
FIG. 4 is a cutaway front view of a principal part of another embodiment of the strainer to be attached to the intake pipe of the apparatus.

Hereupon, strainer 5, as shown in FIG. 4, is made in the form of the cylinder; intake surface 51 with a number of holes is provided at the end toward the outward side and a thread is provided at the external periphery of the other end. On the other hand, the internal periphery of outboard side end 41a of said intake pipe 4 can be provided with thread 41b so that the strainer can be screwed in outboard side end 41a of said intake pipe 4.

Said holding means 6 can be adapted so that coupling pipe 62 mounted on the inboard side end of said intake pipe 4 is coupled to holding frame 61 and intake pipe 4 is held at tubular block 3 by fixing said holding frame 61 to, for example, external cylinder 32 of said tubular block 3.

Said holding frame 61 is constructed to be provided with coupling ring 61a having a thread on its internal periphery at the inboard side end and fixing ring 61b which is fixed on external cylinder 32 of tubular block 3 at the other end of said holding frame. Said fixing ring 61b is secured on said external cylinder 32 with, for example, coupling screw 61c. Said coupling pipe 62 is provided with a thread on external surface 62a and operating handle 62b at the rear end of said external surface.

Said holding means 6 is adapted to screw said coupling pipe 62 in said coupling ring 61a and couple and hold intake pipe 4 on said tubular block 3 by securing said fixing ring 61b at external cylinder 32 and to move said intake pipe 4 in the axial direction by rotating said operating handle 62b, thus causing the outboard side end of said intake pipe 4 to project outside the hull.

Coupling part 42 of said intake pipe 4 is provided with retaining thread 42a on the external surface as shown in FIG. 1 and retaining ring 42b is screwed in said coupling part 42 from the inboard side to retain coupling pipe 62 which is fitted to said coupling part of intake pipe 4.

Said retaining ring 42b is fixed by screw 42c.

As shown in the embodiment, said coupling pipe 62 is adapted so that lock ring 63 is screwed to be positioned between said operating handle 62b and coupling ring 61a of said holding frame 61 in order to fix the coupling position of intake pipe 4.

As described above, said intake pipe 4 is fitted internally into said internal cylinder 31 of tubular block 3 and is held by said holding means 6 on said tubular block. Therefore it is preferable that pipe body 41 can be easily inserted into said internal cylinder 31 and grease is applied onto external periphery 41a of pipe body 41 to make said internal periphery 31a of internal cylinder 31 come in close contact with external periphery 41c of said pipe body 41.

Said intake pipe 4 is provided with a thread at internal periphery 43 of inboard side end 41d by which intake pipe 4 is coupled to piping 40 to be connected to the main engine cooling system.

Said closing means 7 can be constructed so as to open and close the intake port of said tubular block at the outboard side of said tubular block; for example, as shown in an embodiment, said closing means can comprise shut-off plate 71, shut-off plate holding part 72 into which said shut-off plate 71 is fitted to be held, closing mechanism 73 for said shut-off plate 71 and the closing mechanism support 74 which supports said closing mechanism.

Said shut-off plate 71 comprises, for example, circular valve part 71a and closing mechanism coupling part 71b which is provided at an extended end of said valve part 71a so as to open and close the intake port of said tubular block 3.

Said shut-off plate holding part 72 comprises valve cover 721 in which said shut-off plate 71 is inserted and seat plate 722 which is secured on the hull. Said valve cover 721 is provided with valve hole 72a leading to the intake port of said tubular block 3 at its center and guideway 72b at the hull side of said valve cover 721 to cause said shut-off plate 71 to rotate at a right angle to the center axial direction of said valve hole 72a, while seat plate 722 is provided with flat attaching surface 72c to be closely secured on the hull at the hull side of said seat plate 722.

Said shut-off plate holding part 72 is constructed to prevent intrusion of sea water by providing, for example, packing 8c made of Teflon or the like on the internal surface of said valve cover 721 so that said packing 8c comes in contact with said shut-off plate 71 and plate packing 8d between said valve cover 721 and seat plate 722 to prevent intrusion of sea water.

Said valve cover 721 and seat plate 722 are coupled and fixed by set screws 72d.

Said closing mechanism 73 has shaft 73a one end of which is connected to closing mechanism coupling part 71b of said shut-off plate 71 and closing handle 73b which is provided at the other end of said shaft 73a, whereby said shaft 73a is coupled to said closing mechanism coupling part 71b of said shut-off plate 71 by, for example, lock pin 73c so that said shut-off plate 71 is rotated altogether.

Said closing mechanism support 74 is cylindrically formed so that said shaft 73a is inserted into it and is mounted on seat plate 722 of said shut-off plate holding part 72 so that said closing mechanism support 74 is projected toward the inboard side; for example, as shown in the embodiment, said closing mechanism support 74 is screwed on said seat plate 722 by providing a thread on external periphery 74a.

Said closing mechanism 73 is provided with packing 8e and 8f of at its internal periphery to prevent intrusion of sea water.

Hereupon, it is preferable to construct, as shown in the embodiment, said closing mechanism 73 so that said shut-off plate 71 is always kept in close contact with seat plate 722 of said shut-off plate holding part 72 by providing coil spring 73d at said shaft 73a.

In said closing mechanism 73, said coil spring 73d is held by spring holding ring 73e which is secured by lock pin 73f and is always pushing said shaft 73a toward the inboard side direction.

Closing means 7 is positioned at the outboard side of said tubular block 3 by inserting said closing mechanism support 74 of said shut-off plate 71 and said tubular block 3 into through holes 2 and 2' provided in the hull from the outboard side and screwing clamps 9 and 9' on said closing mechanism support 74 and tubular block 3 from the inboard side.

Accordingly, said closing means 7 is adapted to rotate said shut-off plate 71 in a direction at a right angle to the center axis of said valve hole 72a around said closing mechanism coupling part 71b as a fulcrum when said closing handle 7 73b is operated in the vessel, thus opening and closing said valve hole 72a.

Said closing means 7 cannot rotate said shut-off plate 71 since an end of said intake pipe 4 is usually contacting valve hole 72a of valve cover 721 and can rotate said shut-off plate 71 only when said intake pipe 4 is retreated to the inboard side and close the intake port of said tubular block 3 at the outboard side of intake pipe 4.

The cooling water intake apparatus in accordance with the present invention is as described above. Valve hole 72a of closing means 7 is usually opened and the sea water is taken from valve hole 72a through the strainer and is supplied to the main engine cooling system.

If it is necessary to remove sea drifts clogging intake pipe 4, the sea drifts can be removed from intake pipe 4 and strainer 5 by rotating operating handle 62b provided at coupling pipe 62 of said intake pipe 4 to retreat intake pipe 4 toward the inboard side positioning the outboard side end of intake pipe 4 from shut-off plate 71 of said closing means 7, closing valve hole 72a to prevent entry of sea water and removing intake pipe 4 from said tubular block 3. Subsequently, intake pipe 4 from which the sea drifts have been removed is remounted on said tubular block 3, valve hole 72a is opened by rotating shut-off plate 71 of said closing means 7 and said intake pipe 4 is projected toward the outboard side until the outboard side end of said intake pipe 4 comes in contact with said valve hole 72a and can be fixed.

Hereupon, said intake pipe 4 can be removed together with said holding frame 61 from said tubular block 3 by loosening coupling screw 61c of said holding frame 61.

The following describes the relationship between shut-off plate 71 of said closing means 7 and the sea water pressure when the apparatus in accordance with the present invention is operated.

Figure 5A:
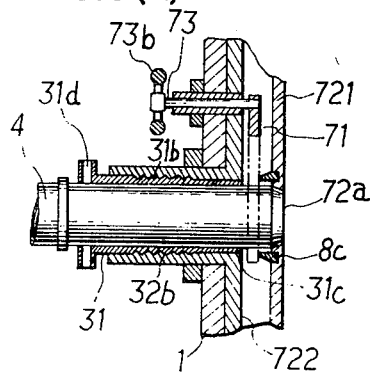
FIGS. 5A, 5B and 5C are sketches illustrating the apparatus when it is opened or closed.
Figure 5B:
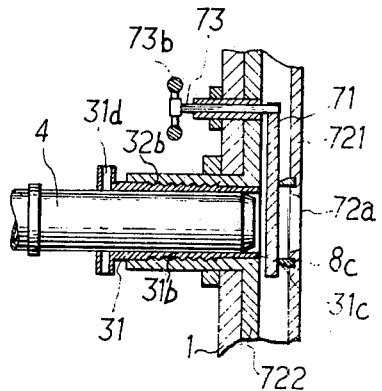
Figure 5C:
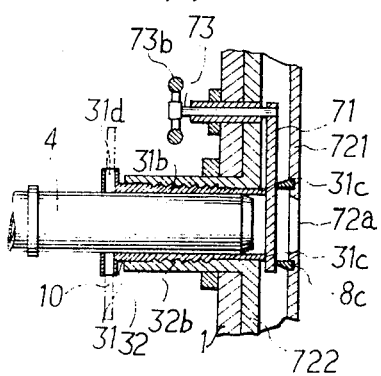

Referring to FIGS. 5A, 5B and 5C, there is shown the opening and closing conditions of the cooling water intake apparatus according to the present invention.

The cooling water intake apparatus according to the present invention is adapted so that the outboard side end of intake pipe is usually contacting with valve hole 72a as shown in FIG. 5A and the water pressure is applied to said shut-off plate 71 as shown in FIG. 5B and shut-off plate 71 is pushed toward the inboard side when said intake pipe 4 is retreated inside the vessel and said shut-off plate 71 is closed.

Therefore, it is preferable to construct the apparatus in accordance with the present invention so that said outboard side end 31c of internal cylinder 31 of said tubular block 3 is forced to closely contact said shut-off plate 71 to support the shut-off plate from the inboard side as shown in FIG. 5C when said intake pipe 4 is retreated toward the inboard side and said shut-off plate 71 is closed.

In this case, said tubular block 3 can be provided with thread 32b on the internal periphery of external cylinder 32 and thread 31b on the external periphery of internal cylinder 31 so that internal cylinder 31 can be screwed on external cylinder 32, and outboard side end 31c can be forced to contact with or depart from said shut-off plate 71 as required by rotating said internal cylinder 31.

Said tubular block 3 is constructed so that hole 31d for rotation at the inboard side end of said internal cylinder 31 to rotate the internal cylinder and rotating bar 10 and others are fitted into said hole 31d, thus rotating said internal cylinder.

If the cooling water intake apparatus in accordance with the present invention is constructed as described above, the outboard side end of said intake pipe 4 is projected to a more outboard side than said shut-off plate 71 as shown in FIG. 5A and outboard side end 31c of internal cylinder 31 of said tubular block 3 is retreated to a more inboard side than said shut-off plate 71, whereby the sea water is taken from valve hole 72a. When it is necessary to remove sea drifts clogging intake pipe 4, operating handle 62b provided at coupling pipe 62 of said intake pipe 4 is rotated to retreat said intake pipe 4 so that the outboard side end of intake pipe 4 is positioned at a more inboard side than said shut-off plate 71 as shown in FIG. 5B, and then said shut-off plate 71 is depressed onto packing 8c to keep a water-tight condition by rotating said shut-off plate 71 to close valve hole 72a and forcing outboard side end 31c of internal cylinder 31 of said tubular block 3 to closely contact with shut-off plate 71 as shown in FIG. 5C. Under this condition, said intake pipe 4 can be removed from said tubular block 3.

Since the cooling water intake apparatus is as described above, it provides the following advantages.

Cleaning of the cooling water intake apparatus can be performed inside the hull and removal of sea drifts clogging the strainer and intake port can be easily performed.

Accordingly, intake pipe 4 and strainer 5 can be easily removed thus vastly reducing the manpower in removing.

Since the outboard side end of intake pipe 4 is usually positioned at a more outboard side than shut-off plate 71 of closing means 7 and said outboard side end is forced to contact valve hole 72a, shut-off plate 71 or shut-off plate guideway 72b of closing means 7 can be prevented from being clogged by sea drifts.

Figure 6:
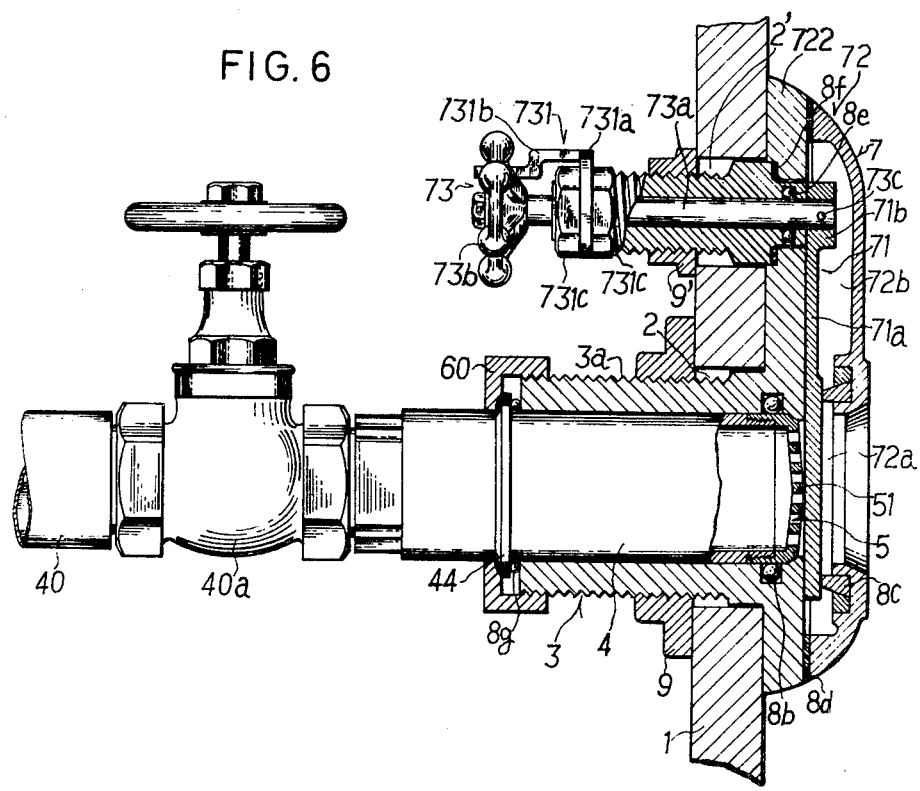
FIG. 6 is a cross sectional front view of a principal part of another embodiment of the apparatus.

Hereupon, the cooling water intake apparatus in accordance with the present invention can be constructed so that said intake pipe 4 is held by tubular block 3 by employing coupling 60 as said intake pipe holding means 6 as shown in FIG. 6.

In this case, said intake pipe 4 is provided with an engaging projection in the circumferential direction on the external periphery of pipe body 41.

Said tubular block 3 need not be divided into internal cylinder 31 and external cylinder 32 as described above and is constructed so that an internal diameter is provided in which said intake pipe 4 can be easily mounted and a thread 3a is provided to screw said coupling 60 on the external periphery.

Said coupling 60 is constructed to be secured by the engaging projection of intake pipe 4 and to be screwed on thread 3a of said tubular block 3, thus coupling said intake pipe 4 to and holding it at tubular block 3.

Accordingly, said intake pipe 4 can be mounted in and dismounted from said tubular block 3 by clamping and unclamping said coupling 60.

Said coupling 60 is screwed on said tubular block 3 so that packing 8g is arranged between engaging projection 44 of said intake pipe 4 and the inboard side end of said tubular block 3 to prevent intrusion of sea water and said packing 8g is pressure-held by said engaging projection 44 and the inboard side end of said tubular block 3.

in case the cooling water intake apparatus in accordance with the present invention is adapted as described above, the intake port of said tubular block 3 can be opened and closed merely by rotating said shut-off plate 71 by closing mechanism 73 of said closing means 7 since said intake pipe 4 is usually positioned at a more inboard side than the shut-off plate 71 of said closing means.

The cooling water intake apparatus in accordance with the present invention can be adapted so that said intake pipe 4 is connected to the piping 40 which is connected to the cooling system for the main engine of a vessel through a water flow control means such as, for example, water flow control valve 40a. Said water flow control valve 40a is satisfactory if it can control the water flow; for example, a sluice valve or cock is selected for this purpose.

In the apparatus according to the present invention is adapted as described above, it is preferable to provide lock mechanism 731 which keeps said closing mechanism 73 opened or closed in the closing mechanism as shown in the embodiment.

Said lock mechanism 731 comprises, for example, rocking ring 731a which is mounted on said closing mechanism support 74 so that said rocking ring can be rocked, engaging piece 731b which is projected at said rocking ring 731a toward handle 73b of said closing mechanism 73, and nuts 731c which secure said rocking ring 731a. When said closing mechanism 73 operates, said engaging piece 731b moves said rocking ring 731a so that the engaging piece disengages from handle 73b of said closing mechanism 73 and, when said closing mechanism finishes its operation, said engaging piece 731b moves said rocking ring 731a so that said engaging piece engages with handle 73b of the closing mechanism.

Accordingly, said lock mechanism 731 can keep said closing mechanism 73 opened or closed by engaging said engaging piece 731b with handle 73b of closing mechanism 73 when said closing mechanism finishes its operation and fixing said rocking ring 731a with said nuts 731c, thus stopping rotation of said handle 73b.

What is claimed is;

1. A cooling water intake apparatus for use with a marine vessel comprising
    a. a tubular block which is secured in a through hole provided in the hull of said vessel wherein said tubular block communicates between the inboard and outboard sides of said hull, said tubular block having an intake port on the outboard side of said hull,
    b. an intake pipe removably inserted into said tubular block,
    c. a strainer attached to said intake pipe, and
    d. a closing means mounted on said tubular block for opening and closing said intake port of the tubular block, wherein said closing means is adapted to open and close said intake port of the tubular block beyond the outboard end of said intake pipe.

2. An apparatus in accordance with claim 1, wherein said closing means comprises a rotatable shut-off plate which intersects at a right angle to the center axis of the intake port of the tubular block.

3. An apparatus in accordance with claim 1, wherein said strainer is removably coupled to said intake pipe.

4. An apparatus in accordance with claim 3, including set screws wherein said strainer is removably coupled to said intake pipe by said set screws.

5. An apparatus in accordance with claim 3, wherein said strainer is removably coupled to said intake pipe by threads provided on mating parts thereof.

6. An apparatus in accordance with claim 1, including an intake pipe holding means for holding said intake pipe within said tubular block.

7. An apparatus in accordance with claim 6, wherein said intake pipe holding means secures said intake pipe in the tubular block so that an outboard side end of said intake pipe is always positioned at a more inboard position of the vessel than said closing means.

8. An apparatus in accordance with claim 6, wherein said intake pipe holding means slidably secures said intake pipe in said tubular block so that an outboard side end of the intake pipe is positioned at a more outboard position than said closing means when the intake port is closed by the closing means.

9. An apparatus in accordance with claim 2, wherein said tubular block comprises an external cylinder secured in the through hole of the hull and an internal cylinder inserted in said external cylinder and wherein said shut-off plate of said closing means contacts the outboard end of said internal cylinder when the shut-off plate closes the intake port.

10. An apparatus in accordance with claim 1, including a lock means for maintaining the open state and closed state of said closing means.

11. An apparatus in accordance with claim 1, including a water flow control means provided at the intake pipe, connected to a piping system which is connected to the cooling system for the main engine of the vessel.

12. A cooling water intake apparatus for use with a marine vessel comprising:
    a. a tubular block passing through a hole in the hull of said vessel, said tubular block communicating between the inboard and outboard side of said hull;
    b. an intake pipe removably inserted in said tubular block;
    c. intake pipe holding means for holding said intake pipe in said tubular block, said intake pipe holding means comprising:
        a coupling pipe mounted on the inboard end of said intake pipe,
        a coupling ring for engaging said coupling pipe, fixing ring mounted on said tubular block, and
        a connecting piece connecting said fixing ring and said coupling ring;
    d. a strainer coupled to said intake pipe; and
    e. closing means mounted on said tubular block for opening and closing the intake port of said tubular block wherein said closing means comprises:
        a shut-off plate for blocking said intake port when in a closed position, and
        means for rotating said shut-off plate between the open and closed positions.

* * * * *